W. F. LANGE.
ANIMAL TRAP.
APPLICATION FILED SEPT. 7, 1920.
1,376,554.
Patented May 3, 1921.
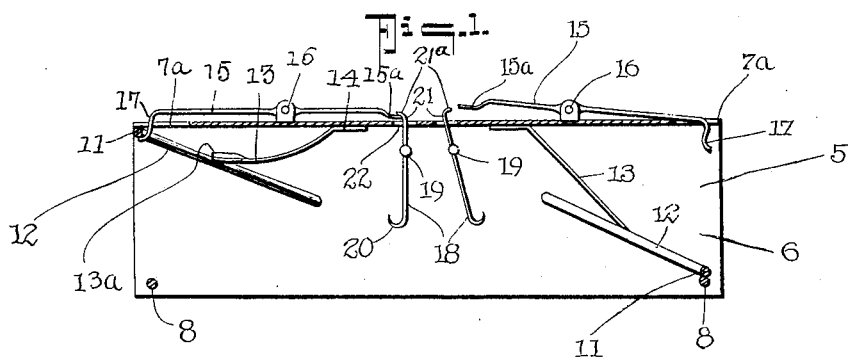
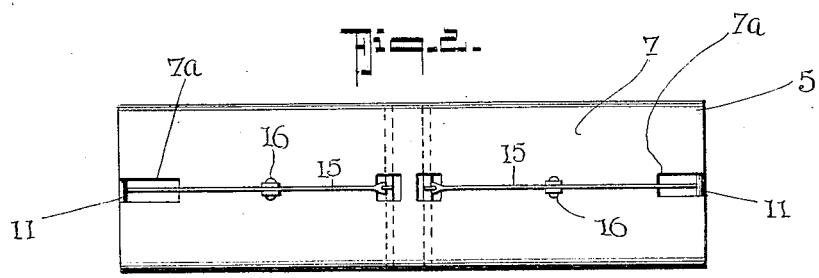
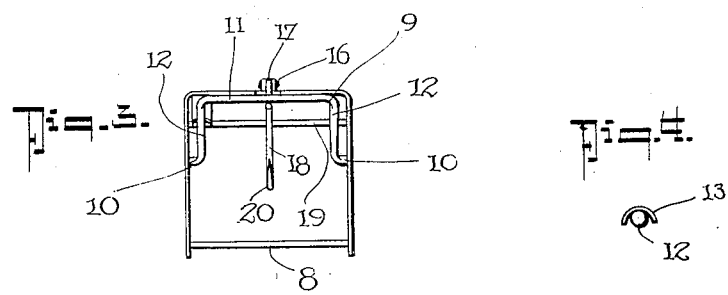
WITNESSES
INVENTOR
W. F. Lange.
BY
ATTORNEYS

UNITED STATES PATENT OFFICE.

WILLAIM FREDERICK LANGE, OF RUNGE, TEXAS.

ANIMAL-TRAP.

1,376,554.  Specification of Letters Patent.  Patented May 3, 1921.

Application filed September 7, 1920. Serial No. 408,712.

*To all whom it may concern:*

Be it known that I, WILLAIM FREDERICK LANGE, a citizen of the United States, and a resident of Runge, in the county of Karnes and State of Texas, have invented certain new and useful Improvements in Animal-Traps, of which the following is a specification.

My invention relates in general to an animal trap, and more particularly to an animal trap especially adapted for use in the extermination of mice and similar rodents.

The object of the invention is to provide a trap of this character of extremely simple construction, highly effective in use and easy and inexpensive to manufacture.

Other objects and advantages of the invention reside in certain novel features of construction, combination and arrangement of parts as will be hereinafter more fully described and particularly pointed out in the appended claim, reference being had to the accompanying drawings forming part of this specification, and in which—

Figure 1 is a longitudinal vertical sectional view of a trap embodying the invention;

Fig. 2 is a plan view;

Fig. 3 is an elevational view; and

Fig. 4 is a detail view of the free end of the steel spring and of the radial arm with which it is engaged.

Referring to the drawings wherein is shown the preferred embodiment of the invention, the numeral 5 designates a casing or body constructed of sheet metal and preferably of elongated rectangular form. The casing 5 embodies vertical side walls 6 and a top wall 7, the bottom and ends of the casing being open. The trap mechanism which is associated with the casing is provided in duplicate so that there is a trap mechanism arranged at each of the open ends of the casing. These trap mechanisms are identical in construction and a description of one will serve as a description of both.

The trap mechanism includes a transverse bar 8 which extends between and has its ends secured in the vertical side walls of the casing. The cross bar 8 functions directly in the extermination of the rodent, and it further serves to brace the casing by strengthening and bracing the side walls thereof. A bail 9, preferably constructed of wire of suitable gage, has its ends 10 rotatably journaled in the side walls of the casing and includes a cross bar 11 which is adapted to coact with the cross bar 8 in the extermination of the rodent. The cross bar 11 is integrally formed with radial arms 12 which carry the ends 10 at their inner extremities. A steel blade spring 13 is secured, as at 14, to the under side of the top wall 7 of the casing and has its free end slidably engaging one of the radial arms 12 of the bail 9. The ends of the spring 13 engaging the radial arm 12 is of concavo-convex form which conforms in general to the contour of the arm and receives the arm in its concavity, as indicated at 13ª and as shown in detail in Fig. 4. The steel spring 13 resists upward movement of the bail 9 and tends to throw the same forcibly downwardly and into engagement with the cross bar 8, as shown to the right in Fig. 1.

A trip rod 15 is pivoted, as at 16, to the upper side of the top wall of the casing and has at its outer end a hook or detent 17 which extends downwardly through a suitable elongated notch 7ª formed in the top wall 7 of the casing. The detent 17 of the trip rod is adapted to engage with the cross bar 11 of the bail to retain the same set, that is, in upper position against the action of the steel spring 13.

A bait hook 18 depends from a rock shaft 19 journaled in the side walls 6 of the casing and arranged to the rear of the bail 9. The lower end of the bait hook is provided with an upwardly curved and sharpened portion, designated at 20 and constituting the hook proper, and upon which the bait is adapted to be impaled. A release arm 21 is also fixed to the rock shaft 19, and preferably extends vertically above the bait hook 18 and through an opening 22 provided therefor in the top wall 7 of the casing. The upper end of the release arm is bent substantially at right angles, as shown at 21ª, and is adapted to extend over and engage a seat 15ª formed on the adjacent end of the trip rod 15 and thus retain the trip rod in position to enable its detent 17 to retain the bail 9 set.

In practice, it will be seen that when the trap is set the parts are in the position shown to the left in Fig. 1 with the bail 9 in the upper position against the action of the spring 13 and retained in this position by engagement of the detent 17 by the rod 15, the trip rod being maintained in position by the action of the release arm 21. It is obvious that if the release arm is disturbed as it will be when the bait hook is moved, the trip rod 15 will be free to swing downwardly to the position shown to the right in Fig. 1 and permit the spring 13 to forcibly throw the bail 9 down against the cross bar 8. Thus, when the rodent, attracted by the bait, enters either open end of the trap and attempts to take the bait from the bait hook 18 it will move the release arm 21 so as to disengage its portion 21ª from the seat 15ª of the trip rod. This releases the trip rod and in turn the bail 9 and the spring 13 acts to throw the bail 9 downwardly. The rodent at this time is necessarily in such a position that its body or a portion of its body lies over the cross bar 8 and in the line of travel of the cross bar 11 of the bail so that the rodent is trapped between the cross bars. It is usually preferred to make the strength of the steel spring such that it will impart sufficient degree of force to the cross bar to kill the rodent but if desired it may be made of sufficient strength to trap him only, and afterward such disposition of him may be made as desired. The trap thus presents an extremely simple and effective means for exterminating rodents and similar pestilent animals.

I claim:

A trap of the character described comprising a casing having vertical side walls and a top wall and open at its ends and trap mechanism arranged at each of the open ends of the casing, each of said trap mechanisms including a cross bar arranged adjacent the open end and having its ends secured, a bail having its ends journaled in the side walls of the casing and having radial arms integral with said ends and a cross bar integral with said radial arms and adapted to coact with said first-mentioned cross bar, a blade spring having one end secured to the under side of the top wall of the casing and having its free end of concavo-convex form and slidably engaged with one of the radial arms of the bail to throw the bail forcibly toward said first-mentioned cross bar, said top wall of said casing having an elongated notch adjacent the open end, a trip rod pivoted on the upper side of said top wall and having a detent at its outer end extending downwardly through said notch and engageable with a cross bar of the bail, a rock shaft journaled in the side walls of the casing in rear of the bail, a bait hook fixed to said rock shaft, said casing having an opening therein disposed above said rock shaft, a release arm fixed to said rock shaft and extending upwardly through said opening and engageable with the trip rod, all as and for the purposes set forth.

WILLAIM FREDERICK LANGE.